United States Patent
Bethmann

(10) Patent No.: US 7,860,670 B2
(45) Date of Patent: Dec. 28, 2010

(54) DEVICE AND METHOD FOR DETECTING A LEAK IN A CYLINDER OF AN INTERNAL COMBUSTION ENGINE

(75) Inventor: Andreas Bethmann, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 74 days.

(21) Appl. No.: 12/332,538

(22) Filed: Dec. 11, 2008

(65) Prior Publication Data
US 2009/0192733 A1 Jul. 30, 2009

(30) Foreign Application Priority Data
Jan. 29, 2008 (DE) .................. 10 2008 006 569

(51) Int. Cl.
*G01M 3/04* (2006.01)
(52) U.S. Cl. .................. 702/51; 73/49.7; 73/114.16
(58) Field of Classification Search .................. 702/50, 702/51, 55; 73/49.7, 114.16
See application file for complete search history.

(56) References Cited

U.S. PATENT DOCUMENTS 5,786,531 A * 7/1998 Lewis et al. .............. 73/114.16
5,945,593 A * 8/1999 Magiera et al. .............. 73/49.7

\* cited by examiner

*Primary Examiner*—John H Le
(74) *Attorney, Agent, or Firm*—Kenyon & Kenyon LLP

(57) ABSTRACT

A device for detecting a leak in a cylinder of an internal combustion engine, the internal combustion engine including a piston in the cylinder, the piston being attached to a crankshaft, includes a time interval determining unit which is designed to determine a first time interval in which the crankshaft passes a preset first angle segment before reaching the ignition top dead center of the piston in the cylinder, and to determine a second time interval in which the crankshaft passes a preset second angle segment after reaching the ignition top dead center of the piston in the cylinder, and a cylinder leak determining unit which is designed to detect a leak in the cylinder as a function of the first time interval and as a function of the second time interval.

13 Claims, 6 Drawing Sheets

DEVICE AND METHOD FOR DETECTING A LEAK IN A CYLINDER OF AN INTERNAL COMBUSTION ENGINE

FIELD OF INVENTION

The present invention relates to a device for detecting a leak in a cylinder of an internal combustion engine as well as to a method for detecting a leak in a cylinder of an internal combustion engine.

BACKGROUND INFORMATION

Previous approaches are known for establishing compression losses at individual cylinders of an internal combustion engine by evaluating a crankshaft sensor signal. In doing this, certain segment travel times are measured and evaluated in the control unit by measuring teeth of a crankshaft sensor wheel, making it possible to infer the time interval that a crankshaft requires to pass a predefined angle segment. If compression losses occur in the monitored cylinder, it takes the crankshaft less time to pass an angle segment before the ignition top dead center of the piston in the cylinder than would be the case when the closure or sealing of the cylinder is error-free (i.e., "okay"). This dead center is also referred to below as "ITDC" to adequately distinguish it from the top dead center between power strokes in which the piston presses combustion gases out of the cylinder and subsequently draws a fresh fuel mixture into the cylinder. The "ignition top dead center," on the other hand, refers to the dead center at which the piston switches from the compression power stroke to the power stroke for igniting the fuel mixture and therefore to the power stroke for initiating the expansion phase. Note that in the description below, this specific ignition top dead center is meant when referring only to a "top dead center."

This shorter time required by the piston to pass the aforementioned angle segment when a leak occurs results from the fact that the compression work to be performed by the piston is reduced, and the piston (and therefore also the crankshaft) does not needed to be braked as forcefully. The opposite effect is obtained accordingly in the expansion phase after the ITDC. Here, the segment travel time increases, since the compression is no longer as substantial as in the case of error-free cylinder closure. These times are currently evaluated separately and directly before the ITDC and after the ITDC, and errors are detected on the basis of a relative monitoring of the individual cylinders. However, a procedure of this type is problematic if tolerances occur in the measuring teeth of a sensor wheel which is attached to the crankshaft and whose measuring teeth are used to determine the time intervals which the crankshaft requires to pass the corresponding angle segments before and after the ITDC. Under some circumstances, the tooth times to be evaluated are corrupted by these sensor wheel tolerances to such a great extent that errors may be incorrectly detected on the cylinders or, alternatively, at high tolerances, a very high error detection threshold must be selected, which causes the diagnostic quality to suffer in the event of an error. As a result, the diagnostic quality is currently dependent on the sensor wheel tolerances.

An object of the present invention is therefore to provide a way to detect leaks in a cylinder of the internal combustion engine better and more economically, in particular also to compensate for sensor wheel tolerances using a simple and cost-effective approach.

SUMMARY OF THE INVENTION

The present invention provides a device for detecting a leak in a cylinder of an internal combustion engine, the internal combustion engine including a piston in the cylinder which is attached to a crankshaft, the device having the following features:
 a time interval determining unit which is designed to determine a first time interval in which the crankshaft passes a preset first angle segment before reaching the ignition top dead center of the piston in the cylinder, and to determine a second time interval in which the crankshaft passes a preset second angle segment after reaching the ignition top dead center of the piston in the cylinder; and
 a cylinder leak determining unit which is designed to detect a leak in the cylinder as a function of the first time interval and as a function of the second time interval.

The present invention is based on the knowledge that linking the time intervals before and after the top dead center of the monitored cylinder provides a simple means of improving the detection of a leak in the cylinder of the internal combustion engine. In particular, this approach makes use of the interdependency by which the compression pressure and the expansion pressure in the monitored cylinder vary when a leak occurs in the cylinder. In doing this, a linkage of the segment travel times which the crankshaft requires to pass a preset angle segment before and after the ITDC of the piston supplies a much better result with regard to the detection of leaks in the cylinder than does the separate evaluation of segment travel times only before or only after the ITDC. At the same time, this linkage of segment travel times may also provide a more robust evaluation, in particular when sensor wheel tolerances occur, since the approach according to the present invention may slightly compensate for these tolerances because two angle segments are evaluated for each cylinder. The approach according to the present invention therefore provides the advantage of enabling the diagnostic quality to be substantially improved by algorithmically preparing and linking the already available signals.

It is also favorable if the cylinder leak determining unit is designed in a further embodiment to detect the leak on the basis of a difference between the first and second time intervals. This makes use of the fact that, when a leak occurs in the cylinder, opposite effects, which are amplified by calculating the difference, occur during compression before reaching the ITDC and during expansion after reaching the ITDC. The signal obtained thereby may thus be evaluated more accurately, which increases the robustness of the approach proposed herein.

According to another embodiment, the internal combustion engine may have a plurality of additional cylinders, each including a piston which is attached to the crankshaft, it being possible to design the time interval determining unit to determine a first piston time interval for each piston in the additional cylinders, the crankshaft passing an angle segment in this time interval before reaching the top dead center of the particular piston in the corresponding cylinder of the additional cylinders. The time interval determining unit may also be designed to determine a second piston time interval for each piston of the additional cylinders, the crankshaft passing an angle segment in this time interval after reaching the top dead center of the particular piston in the corresponding cylinder of the additional cylinders. The cylinder leak determining unit may additionally be designed to link the first and second time intervals of the cylinder as well as the first and second piston time intervals of the remaining cylinders and to detect a leak in the cylinder on the basis of this linkage. This provides the advantage that the inclusion of the additional cylinders of the internal combustion engine makes it possible to compensate for engine-specific idiosyncrasies and enables the leak to be detected only on the basis of a deviation between the values of the cylinder and the values of the additional cylinders.

In a further embodiment, the cylinder leak determining unit may be designed to ascertain a first ratio, a mean value of the first piston time interval of the remaining cylinders being formed, from which the first time interval of the cylinder is subtracted and the result of the subtraction is divided by the first time interval of the cylinder. The cylinder leak determining unit may also be designed to ascertain a second ratio, a mean value of the second piston time intervals of the remaining cylinders being formed, from which the second time interval of the cylinder is subtracted and the result of this subtraction is divided by the second time interval of the cylinder. Finally, the cylinder leak determining unit may be designed to form the linkage on the basis of the first and second ratios for the purpose of detecting a leak in the cylinder. By taking the first and second ratios into account, as described above, it is possible to normalize the detected measured values with regard to the cylinder. This makes it possible to compare the cylinders relative to each other.

In another embodiment, the cylinder leak determining unit may also be designed to subtract the second ratio from the first ratio to ascertain an overall deviation value for the cylinder and to determine the presence of a leak in the cylinder on the basis of the obtained overall deviation. By forming this difference, it is possible to amplify the compression and expansion effects which are produced by the leaks and which act upon the crankshaft before and after it passes the ITDC, and the relative evaluation of the cylinders to one another is substantially improved and therefore results in better diagnostic quality.

It is also favorable if the internal combustion engine has a second piston in a second cylinder of the plurality of additional cylinders, this second piston being attached to a segment of the crankshaft which has the same orientation with regard to a rotation axis as a segment of the crankshaft to which the piston of the cylinder is attached. In this case, the cylinder leak determining unit may then be designed to determine an overall deviation value for each cylinder of the internal combustion engine for the purpose of detecting a leak in the cylinder, to ascertain a mean value of the overall deviation values of all cylinders of the internal combustion engine therefrom, and to subtract a mean value of the overall deviation values for the cylinder and the second cylinder from the ascertained mean value of the overall deviation values of all cylinders of the internal combustion engine for the purpose of obtaining a segment correction value. This segment correction value may then be added to the overall deviation value of the cylinder for the purpose of inferring the leak in the cylinder from the addition result. This provides the advantage that, by using the knowledge that two cylinders are attached to the same crankshaft segment when there is an even number of cylinders, it is possible to correct the measured values recorded for all cylinders. As a result, it is once again possible to more accurately determine a leak in the cylinder, and the result is nearly independent of sensor wheel tolerances.

If the internal combustion engine has a throttle valve, it is also possible to design the time interval determining unit to determine the first and second time intervals when the throttle valve is opened wider than would be the case in its normal position upon starting the internal combustion engine. For example, the throttle valve may be opened to more than 10 percent of its maximum opening capacity. This provides the advantage of utilizing the interdependency by which the compression loss (work) or expansion work is greater (thus improving detection) in the presence of a (cylinder) leak the wider the throttle valve is opened, since it is possible to fill the cylinder to maximum capacity with fresh air without producing throttling loss.

According to an embodiment of the present invention, a sensor wheel having measuring teeth is attached to the crankshaft, the measuring teeth being spaced an equal distance apart within a defined tolerance range, it being possible for the time interval determining unit to have a position detecting unit which is designed to determine the first and second time intervals, using the measuring teeth of the sensor wheel. The defined tolerance range may lie between 1% and 5%. Due to the more accurate evaluation capability, this makes it possible to use conventional sensor wheels having standard tolerances between 1% and 5% without running the risk of no longer being able to correctly detect the cylinder leak, or of incorrectly detecting a leak in cylinders which are, in fact, leakproof. This provides a more accurate and more robust diagnosis.

In another embodiment, in which the internal combustion engine includes an ignition system for igniting a fuel mixture in the cylinder or includes an injection system for injecting a fuel mixture into the cylinder, the time interval determining unit may be designed to determine the first and second time intervals when the ignition system is in an idle state in which the fuel mixture in the cylinder is not ignited, or when the injection system is in an idle state in which the fuel mixture is not injected into the cylinder. This provides the advantage that interfering effects from the combustion process in the cylinder do not impair the measurement of the time intervals, which could otherwise result in the failure to correctly detect any leaks that may be present in the cylinder closure. For example, the time interval determining unit may be designed to determine the first and second time intervals when the combustion engine is being rotated at the starter rotational speed by the starter, i.e., by an external drive.

It is also favorable if the cylinder leak determining unit is designed to detect the leak in the cylinder by applying a threshold value decision. This provides a numerically easy-to-implement means of detecting a leak which occurs in the cylinder.

In a further embodiment of the present invention, a method is provided for detecting a leak in a cylinder of an internal combustion engine, the internal combustion engine having a piston in the cylinder which is attached to a crankshaft, and the method including the following steps:

determining a first time interval in which the crankshaft passes a preset first angle segment before reaching the top dead center of the piston in the cylinder, and determining a second time interval in which the crankshaft passes a preset second angle segment after reaching the top dead center of the piston in the cylinder; and detecting a leak in the cylinder as a function of the first time interval and as a function of the second time interval.

Furthermore, the aforementioned method may be carried out not only on an individual cylinder (such as the monitored cylinder), but also for all cylinders, so that each cylinder in the internal combustion engine is examined once as a cylinder. The aforementioned method may therefore be used to test all cylinders for leaks.

In a further embodiment of the present invention, the first and second time intervals may be determined during a rotation of the crankshaft at a rotational speed which corresponds to a rotational speed of a starter upon starting the internal combustion engine. This provides the advantage that the compression in the cylinders is high enough for compression losses due to a leak of the cylinder to produce much weaker braking of the crankshaft than in an error-free situation, so that the leaks are detectable in a simple and robust manner.

The present invention also includes a computer program for carrying out the aforementioned method when the computer program is run on a data processing system. This makes it possible to use the on-board computers commonly found in vehicles having internal combustion engines for evaluating the determination of a leak in a cylinder in a test mode. Alternatively, workshop computers may be used to carry out the method in a system check during a vehicle inspection.

Figure 1:
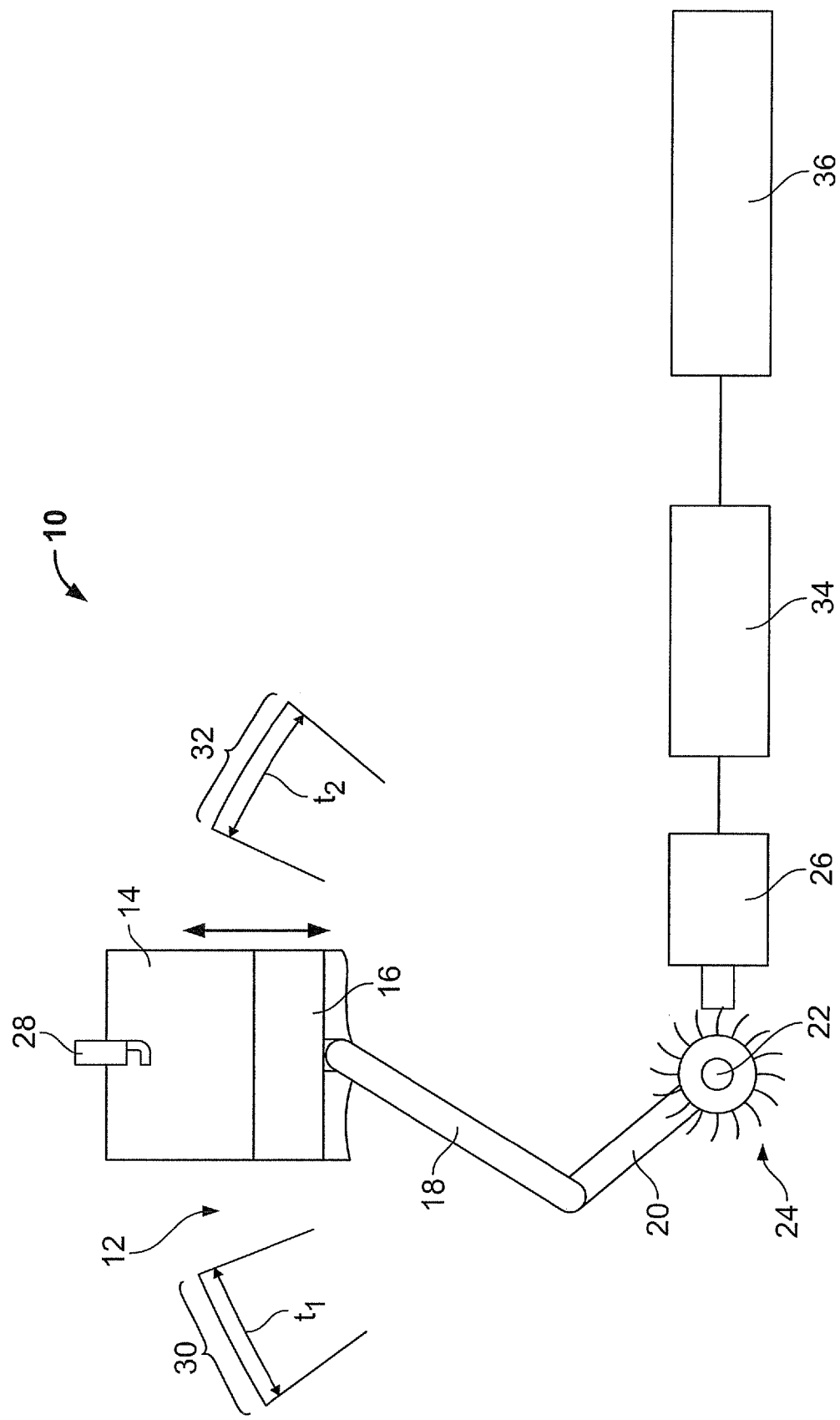
FIG. 1 shows a block diagram of an exemplary embodiment of a device according to the present invention, on the basis of which the functionality of the approach according to the present invention is explained.

In the following figures, equivalent or similar elements may be provided with equivalent or similar reference numerals. Furthermore, any dimensions and sizes that may be indicated are stated only by way of example, so that the present invention is not limited to these dimensions and sizes. The figures in the drawings, their descriptions and the claims also contain numerous features in combination. It is clear to those skilled in the art that the features may also be viewed individually or that they may be combined into other combinations not described explicitly herein.

DETAILED DESCRIPTION OF THE INVENTION

FIG. 1 shows a block diagram which illustrates the principle structure of an exemplary embodiment of device 10 according to the present invention in interaction with the components of an internal combustion engine 12. Internal combustion engine 12 includes a cylinder 14 in which a piston 16 is able to move up and down, this piston, in turn, being attached to a crankshaft 20 by a connecting rod 18. Connecting rod 18 is attached to a segment which is offset from rotation axis 22 of crankshaft 20. Internal combustion engine 12 usually includes multiple cylinders which have a structure similar to that of cylinder 14, but which are not shown in FIG. 1 for the purpose of better clarity. Crankshaft 20 has a sensor wheel 24 on a segment which lies on the rotation axis of crankshaft 20. This sensor wheel 24 has sensor wheel teeth, which may be used to determine the instantaneous rotation angle of crankshaft 20 with the aid of a position detecting unit 26. To determine the absolute position of crankshaft 20, sensor wheel 24 has a gap in the sensor wheel ring gear, making it possible to determine a "zero" position of crankshaft 20. Alternatively to the sensor wheel, other devices may also be used for determining the rotation angle of rotation axis 22 (for example, an optically readable disk).

Leaks in cylinder 14 (for example, leaks at the seals around valves or elements 28 of an injection or ignition system) cause internal combustion engine 12 to lose power, which must be avoided. For this purpose, it is possible to utilize the interdependency by which the compression work to be performed on piston 16 when piston 16 ascends is less in the presence of a leak in cylinder 14 than in the case of an error-free cylinder 14, while cylinder 14 performs less expansion work as piston 16 descends. To avoid interference caused by pressure fluctuations during fuel combustion in cylinder 14, the detection of leaks in cylinder 14 should be carried out in a practical manner as a workshop test at a starter speed without injection (or without ignition). A test of this type should favorably be carried out when the throttle valve is open to the maximum extent to enable the cylinder to be filled with the maximum air charge and thereby to obtain higher compression (loss) work or expansion work. A closed throttle valve causes the diagnostic quality to deteriorate.

The compression or expansion work of cylinder 14 may be determined by evaluating the piston velocity, namely by determining a first time interval $t_1$, which crankshaft 20 requires to pass a preset first angle segment 30 before the top dead center (compression work) and by determining a second time interval $t_2$, which crankshaft 20 requires to pass a preset second angle segment 32 after the ignition top dead center (expansion work). First angle segment 30 and second angle segment 32 may be of equal size (for example, 12°). The position of these angle segments must be ascertained on an engine-specific basis and therefore should be variably adjustable. To ensure the most uniform evaluation possible for all cylinders, the crankshaft velocities should also be evaluated for the remaining cylinders in a corresponding angle segment range before and after the ITDC. It is possible to cover a sufficiently large rotation angle in which the rotation of crankshaft 20 is easily and reliably detectable by sensor wheel 24. First and second time intervals $t_1$ and $t_2$ may be determined on the basis of the signal of position detecting unit 26 (which evaluates the position of the sensor wheel teeth of sensor wheel 24) in time interval determining unit 34.

As mentioned above, it is important according to the described procedure for the tolerances of the distances between the measuring teeth of the sensor wheel (or of the alternative sensors) not to be too great. Due to the approach according to the present invention, the aforementioned method must be made more robust with respect to sensor wheel tolerances and, at the same time, even more accurate with regard to error detection. To economically achieve these improvements in robustness, the sensor wheel tolerances must be equalized by a compensation algorithm. To amplify the diagnostic feature characterizing the error situation, the two time intervals $t_1$ and $t_2$ before and after the ignition top dead center should be skillfully linked for each cylinder. This linkage may be carried out in cylinder leak determining unit 36, which determines whether or not a leak has occurred based on detected first and second time intervals $t_1$ and $t_2$ for the monitored cylinder. This cylinder leak determining unit 36 may be a workshop tester or a control unit in the engine controller of the internal combustion engine.

By linking the time intervals before and after the ignition top dead center in the form of subtraction, it is possible to amplify the signal for each cylinder, making it possible to use only an overall threshold for each cylinder instead of a separate threshold for each ascertained time interval. The amplification is produced by utilizing the opposite effects before and after the top dead center. The characteristic distance between the error-free cylinders ("OK" scenario; "okay" scenario) and a malfunctioning cylinder therefore increases. In particular, a comparison between multiple cylinders of internal combustion engine 12 may be carried out to compensate for engine-specific effects.

In particular, to determine a leak, normalized absolute values of time interval differences $\Delta_{cylx}(vOT)$ and $\Delta_{cylx}(nOT)$ are ascertainable for cylinder x to determine a leak in the cylinder leak determining unit. To determine first normalized absolute value of time interval difference $\Delta_{cylx}(vOT)$ a mean value is formed from the first piston time intervals for the additional cylinders (excluding cylinder x). First time interval $t_1$ of cylinder x is subtracted from this mean value, and the difference is divided by first time interval $t_1$ of cylinder x. To determine second normalized absolute value of time interval difference $\Delta_{cylx}(nOT)$, a mean value is formed from the second piston time intervals for the additional cylinders (excluding cylinder x). Second time interval $t_2$ of cylinder x is subtracted from this mean value, and the difference is divided by second time interval $t_2$ of cylinder x.

Figure 2A:
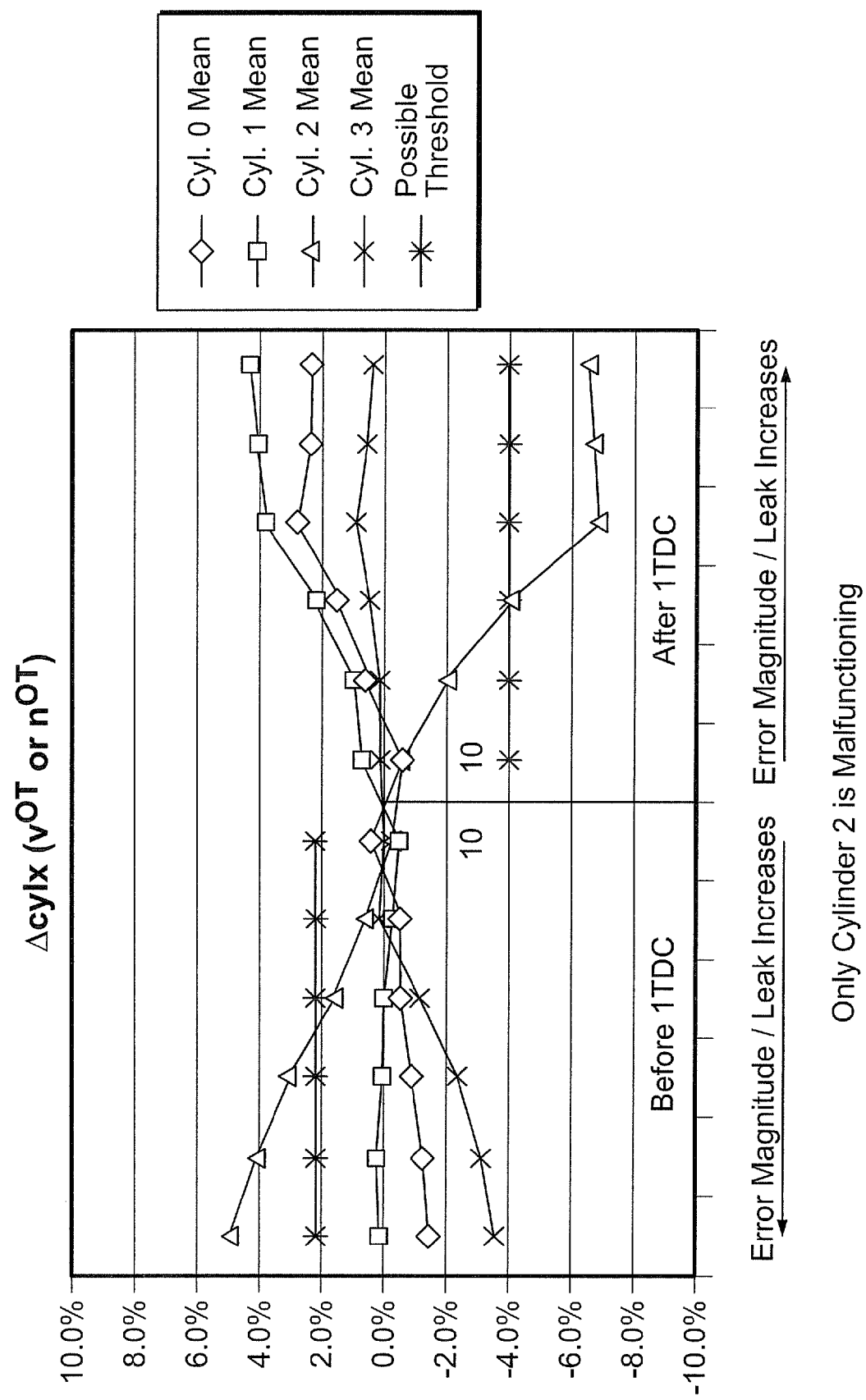
FIGS. 2A-2D show diagrams in which the effects of cylinder leaks of varying magnitudes and the detection means thereof are illustrated by the approach according to the present invention.

FIG. 2A shows relative deviation values $\Delta_{cylx}(vOT)$ and $\Delta_{cylx}(nOT)$ for the 4 cylinders of a 4-cylinder internal combustion engine, 10 measurements being carried out in each case, and the resulting mean value of these measurements being shown in the diagram in FIG. 2A for $\Delta_{cylx}(vOT)$ and $\Delta_{cylx}(nOT)$ for the purpose of compensating for measured value errors of the individual measurements. Errors of different magnitudes are provided in cylinder number 2 in the form of leaks through holes having different diameters in the cylinder. To capture the diagram from FIG. 2A, these leaks were implemented by mounting error simulation inserts in the opening for the injection nozzles or spark plugs. The different leak magnitudes used for the situation before the piston reaches the top dead center and after the piston reaches the top dead center are plotted on the x axis (mean values marked "OK" correspond to a non-malfunctioning ("okay") system; increasing leak magnitudes are shown next to them in each case). Relative deviation values $\Delta_{cylx}(vOT)$ and $\Delta_{cylx}(nOT)$ are plotted on the y axis for each of the corresponding cylinders. The line marked by triangles in FIG. 2A for cylinder number 2 clearly shows the influences on the segment times described above (i.e., the time intervals) before the ITDC (left side) and after the ITDC (right side) when leaks occur. According to conventional methods, these measured values are evaluated by two separate threshold values before and after reaching the ITDC, as shown in FIG. 2A. Due to the different versions of the deviations, different threshold values usually must be used for this purpose, which means that the conventional approach is complicated to carry out, on the one hand and, on the other hand, it is not precise enough for highly accurate error determination, due to what may be unfavorable threshold value selections. However, since compression loss always results in positive deviations before the ITDC and in negative deviations after the ITDC, a difference between absolute value of first time interval difference $\Delta_{cylx(vOT)}$ and absolute value of second time interval difference $\Delta_{cylx(nOT)}$ may be calculated for assessing the overall influence.

Figure 2B:
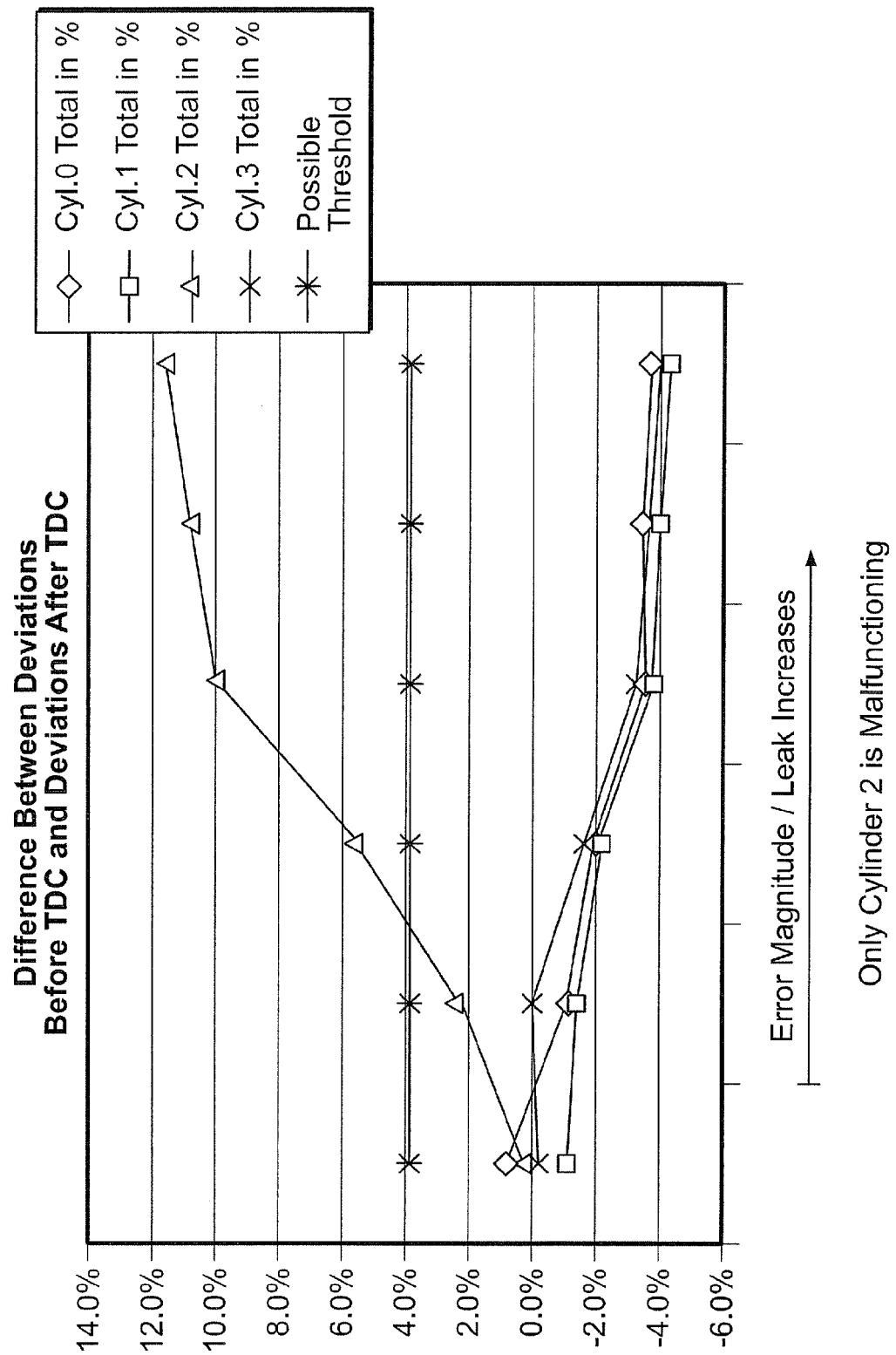

FIG. 2B shows a diagram of this difference between the deviations before and after the top dead center, only the reference to the different sizes of the leak diameter being plotted. The light line for cylinder number 2 shows that the subtraction operation substantially amplifies the feature characterizing the error situation, which makes it possible to improve the quality of detection as well as more easily ascertain the threshold value for the error situation (if, for example, 4% of the deviation difference is present).

Figure 2C:
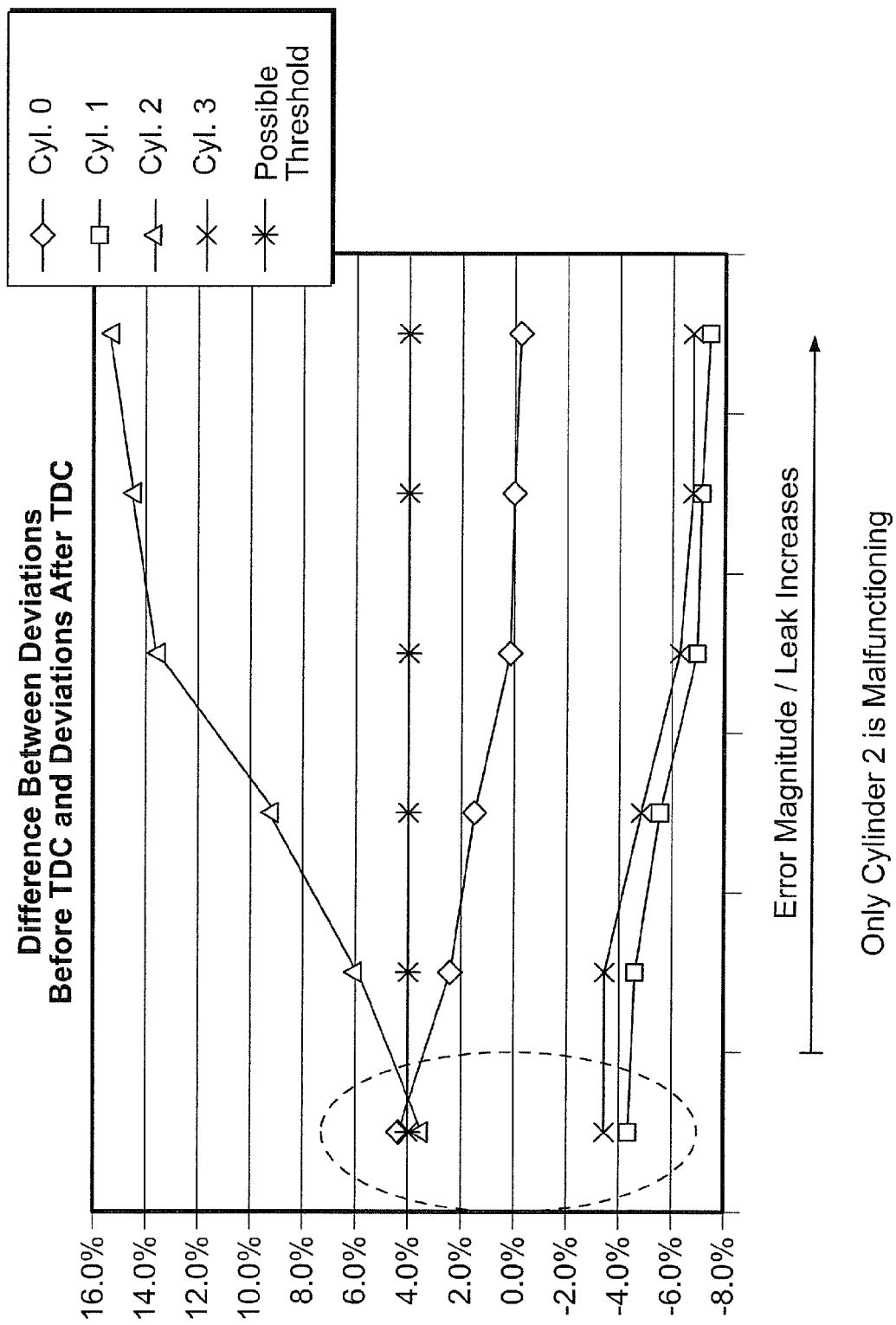

In engines having an even number of cylinders, the sensor wheel error may be compensated by utilizing the interdependency by which two cylinders usually occur on the same segment of the crankshaft (and therefore also on the same segment of the crankshaft sensor wheel), which means that the same errors also result in the measured segment times or time intervals. These sensor wheel errors, in principle, have an effect in proportion to the measured segment times, i.e., a 5% deviation in the length of a segment produces a 5% deviation in the measured segment time (i.e., the 5% tolerance of the sensor wheel measuring teeth causes "evaluation" angle segment 30 or 32 to be incorrectly determined by the same 5% tolerance, so that this also causes time intervals $t_1$ and $t_2$ to be incorrectly determined). This error was simulated accordingly. FIG. 2C shows the simulation result for the difference between the deviations before and after the ITDC (using a measuring tooth tolerance of −5%). Cylinders 0 and 2 are assumed to be attached to the same crankshaft segment (i.e., the crankshaft segments to which the pistons of cylinders 0 and 2 are attached have the same orientation with regard to the rotation axis of the crankshaft). FIG. 2C clearly shows that sensor wheel errors have the same effect on two cylinders. In this case, a tolerance of −5% means that the 4% detection threshold for cylinders 0 and 2 all but results in error detection even in the error-free situation (i.e., in a cylinder without compression loss).

To compensate for this effect of influencing two cylinders, a correction value $K_{segment}$ may be used to easily correct the overall deviation of the cylinders, whereby a mean value of the overall deviation of all cylinders attached to the same crankshaft segment is subtracted from the mean values of the overall deviations (measured across all cylinders). This correction value $K_{segment}$ for the cylinders attached to the same crankshaft segment is then added to the value for the overall deviation measured on the (reference) cylinder to obtain the corrected overall deviation value for the cylinder.

Figure 2D:
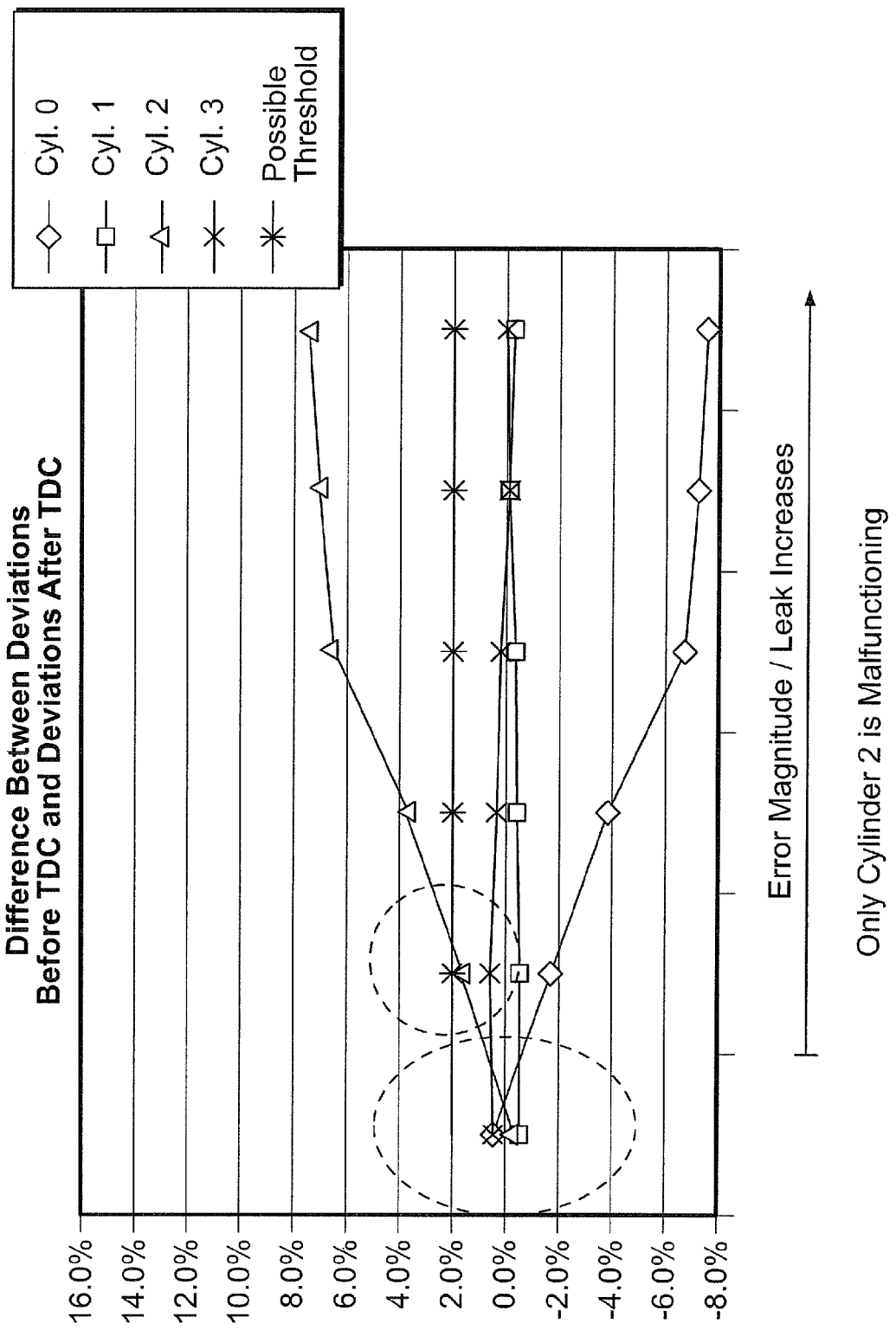

After the compensation is carried out, the aforementioned parameters may be used to obtain a diagram of the overall deviations before or after the ITDC, as shown in FIG. 2D. This diagram clearly shows that the decision threshold for detecting a leak in a cylinder may be reduced to a 2% deviation, and a leak in the cylinder is still clearly detectable.

Figure 3:
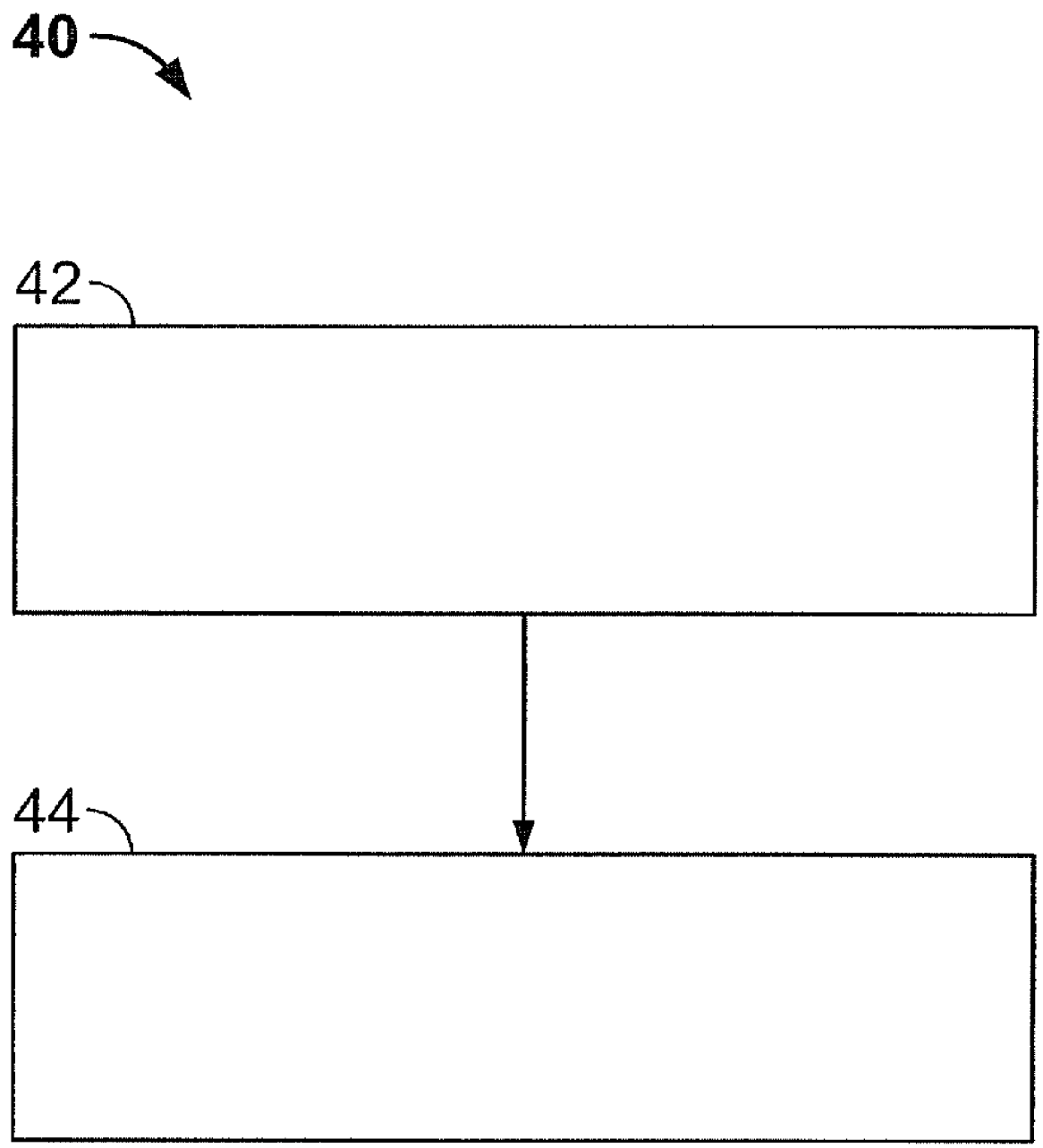
FIG. 3 shows a flow chart of an exemplary embodiment of a method according to the present invention.

FIG. 3 shows a flow chart of an exemplary embodiment of a method 40 according to the present invention. In a first step 42 according to this flow chart, a first time interval is determined in which the crankshaft passes a preset first angle segment before reaching the ignition top dead center of the piston in the cylinder, and a second time interval is determined in which the crankshaft passes a preset second angle segment after reaching the ignition top dead center of the piston in the cylinder. In a further step 44, this is followed by correlating the first and second time intervals and detecting a leak in the cylinder on the basis of the relationship between the first and second time intervals. In particular, second step 44 may be carried out in such a way that the compensation algorithm described above is executed.

The compensation method described therefore provides the advantage of making the proposed approach much more robust than sensor wheel influences. In addition, the feature characterizing the malfunction is minimized in the error situation, and the "noise" during detection of an error-free state is therefore reduced. This, in turn, makes it possible to reduce the error detection threshold. At the same time, the error detection threshold remains almost the same, regardless of the sensor wheel error.

What is claimed is:

1. A device for detecting a leak in a cylinder of an internal combustion engine, the internal combustion engine including a piston in the cylinder, the piston being attached to a crankshaft, the device comprising:

a time interval determining unit configured to determine a first time interval in which the crankshaft passes a preset first angle segment before reaching an ignition top dead center of the piston in the cylinder, and a second time interval in which the crankshaft passes a preset second angle segment after reaching the ignition top dead center of the piston in the cylinder; and a cylinder leak determining unit configured to detect a leak in the cylinder as a function of the first time interval and as a function of the second time interval.

2. The device according to claim 1, wherein the cylinder leak determining unit is configured to detect the leak in the cylinder as a function of a difference between the first time interval and the second time interval.

3. The device according to claim 1, wherein:
the internal combustion engine includes a plurality of additional cylinders, in each of which a piston is situated, the piston being attached to the crankshaft;
the time interval determining unit is configured to determine, for each of the pistons in the additional cylinders, a first piston time interval in which the crankshaft passes an angle segment before reaching an ignition top dead center of that particular piston in the corresponding additional cylinder;
the time interval determining unit is configured to determine, for each of the pistons in the additional cylinders, a second piston time interval in which the crankshaft passes an angle segment after reaching the ignition top dead center of that particular piston in the corresponding cylinder of the additional cylinders; and
the cylinder leak determining unit is configured to link together the first time interval and the second time interval as well as the first and second piston time intervals and to detect a leak in the cylinder on the basis of the linkage.

4. The device according to claim 3, wherein:
the cylinder leak determining unit is configured to ascertain a first ratio, a mean value of the first piston time interval being formed, from which the first time interval is subtracted, and the result of the subtraction being divided by the first time interval;
the cylinder leak determining unit is configured to ascertain a second ratio, a mean value of the second piston time interval being formed, from which the second time interval is subtracted, and the result of this subtraction being divided by the second time interval; and
the cylinder leak determining unit is configured to form the link on the basis of the first ratio and the second ratio for the purpose of detecting a leak in the cylinder.

5. The device according to claim 4, wherein the cylinder leak determining unit is configured to subtract the second ratio from the first ratio for the purpose of ascertaining an overall deviation value for the cylinder, and to determine the presence of a leak in the cylinder on the basis of the overall deviation obtained.

6. The device according to claim 5, wherein the internal combustion engine has a second piston in a second cylinder of the plurality of additional cylinders, the second piston being attached to a segment of the crankshaft having the same orientation with regard to a rotation axis of the crankshaft as a segment of the crankshaft to which the piston of the cylinder is attached, wherein the cylinder leak determining unit is configured to:
determine an overall deviation value for each cylinder of the internal combustion engine for the purpose of detecting a leak in the cylinder,
ascertain therefrom a mean value of the overall deviation values for all cylinders of the internal combustion engine,
subtract a mean value of the overall deviation values for the cylinder and the second cylinder from the ascertained mean value of the overall deviation values of all cylinders of the internal combustion engine, thereby obtaining a segment correction value, and
add the segment correction value to the overall deviation value of the cylinder.

7. The device according to claim 1, wherein the internal combustion engine has a throttle valve, wherein the time interval determining unit is configured to determine the first time interval and the second time interval when the throttle valve is open to a greater extent than in its normal position upon starting the internal combustion engine.

8. The device according to claim 1, wherein a sensor wheel has measuring teeth being attached to the crankshaft, the measuring teeth being spaced an equal distance apart within a defined tolerance range, wherein the time interval determining unit includes a position detecting unit configured to determine the first time interval and the second time interval, using the measuring teeth of the sensor wheel.

9. The device according to claim 1, wherein the internal combustion engine includes at least one of an ignition system for igniting a fuel mixture in the cylinder and an injection system for injecting a fuel mixture into the cylinder, wherein the time interval determining unit is configured to determine the first time interval and the second time interval at least one of when the ignition system is in an idle state in which the fuel mixture is not ignited in the cylinder, and when the injection system is in an idle state in which the fuel mixture is not injected into the cylinder.

10. The device according to claim 1, wherein the cylinder leak determining unit is configured to detect the leak in the cylinder by applying a threshold value decision.

11. A method for detecting a leak in a cylinder of an internal combustion engine, the internal combustion engine including a piston in the cylinder, the piston being attached to a crankshaft, the method comprising:
determining a first time interval in which the crankshaft passes a preset first angle segment before reaching a top dead center of the piston in the cylinder;
determining a second time interval in which the crankshaft passes a preset second angle segment after reaching the top dead center of the Piston in the cylinder; and
detecting a leak in the cylinder as a function of the first time interval and as a function of the second time interval, wherein the detecting is performed using a cylinder leak determining unit;
wherein the first time interval and the second time interval are determined by a time interval determining arrangement having a position detecting arrangement.

12. The method according to claim 11, wherein the first time interval and the second time interval are determined during a crankshaft rotation at a rotational speed which corresponds to the rotational speed of a starter upon starting the internal combustion engine.

13. The computer-readable medium containing a computer program which, when executed by a processor, performs a method for detecting a leak in a cylinder of an internal combustion engine, the internal combustion engine including a piston in the cylinder, the piston being attached to a crankshaft, the method comprising:
determining a first time interval in which the crankshaft passes a preset first angle segment before reaching a top dead center of the piston in the cylinder;
determining a second time interval in which the crankshaft passes a preset second angle segment after reaching the top dead center of the piston in the cylinder; and
detecting a leak in the cylinder as a function of the first time interval and as a function of the second time interval.

* * * * *